3,356,576
FUEL SHEATHING FAILURE DETECTION IN
LIQUID COOLED NUCLEAR REACTORS
James Alan McKnight, Hale, Altrincham, England, assignor to United Kingdom Atomic Energy Authority, London, England
Filed Mar. 7, 1966, Ser. No. 532,238
Claims priority, application Great Britain, Mar. 8, 1965, 9,699/65
5 Claims. (Cl. 176—19)

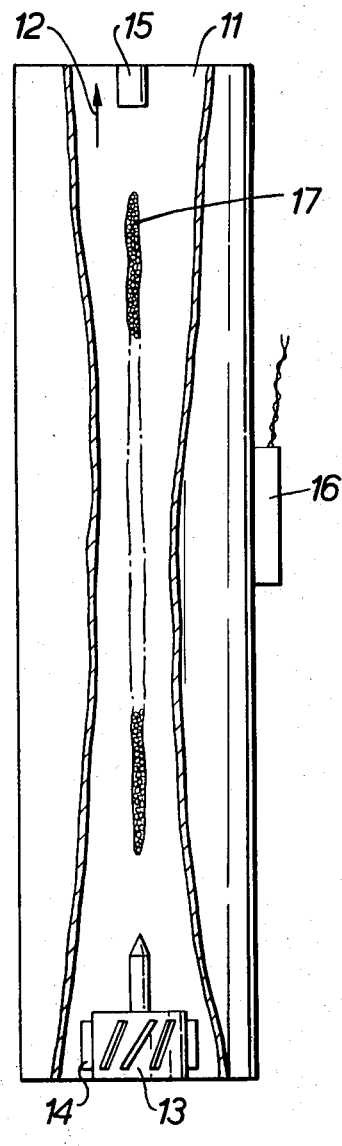

ABSTRACT OF THE DISCLOSURE

To test for the occurrence of fuel sheathing failure in a liquid cooled nuclear reactor, coolant that has passed over a fuel member is passed through a tube and has rotary motion imparted to it such that bubbles in the coolant occupy a position about the longitudinal axis of the tube, their axial movement in the tube being restrained. The presence of bubbles is detected, for instance, by a microphone alongside the tube or by detecting the attenuation of a beam of radiation by the existence of the bubbles. Two bosses are serially disposed in the tube to partially obstruct the flow path, and the upstream boss includes blades to impart rotary motion to the coolant.

---

The present invention relates to a method of and apparatus for testing for the occurrence of fuel sheathing failure in liquid cooled nuclear reactors. In the event of such a sheathing failure gaseous fission products released from the fuel pass into the surrounding coolant as small bubbles. In some existing methods for detecting such release the coolant is sampled after leaving the reactor core and the samples are then either tested for the emission of delayed neutrons or for radioactive daughter products, said neutrons and said daughter products arising from any fission products present.

According to the present invention a method of testing for the occurrence of fuel sheathing failure in a liquid cooled nuclear reactor, comprises the steps of passing coolant over at least one fuel bearing member in the reactor and then through a tube defining a flow path for coolant, imparting to cooalnt flowing through the flow path rotary motion about the longitudinal axis of the flow path so that bubbles in the coolant are urged centripetally to occupy a position about said axis, restraining axial movement of the bubbles by partial obstructions in the flow path and testing for the presence of bubbles in said position.

Also according to the present invention apparatus for testing for the occurrence of fuel sheathing failure in a liquid cooled nuclear reactor comprises a tube defining a flow path for coolant from the reactor, two bosses, disposed in series in, and partially obstructing the flow path, the second boss being situated downstream of, and obstructing the flow path of a lesser extent than, the first boss, means for imparting rotary motion to coolant in the flow path about the longitudinal axis of the flow path, at least between the bosses, and means for detecting bubble accumulations between the two bosses.

Apparatus embodying the invention will now be described, by way only of example, with reference to the accompanying drawing which is a perspective view.

The drawing shows a cutaway perspective view of a circular section tube 11 through which flows reactor coolant water in the direction of arrow 12. A first boss 13 of diameter D is provided in the tube, the boss 13 having blades 14 mounted around it to impart a rotary motion to the water around the longitudinal axis of the tube 11. A second boss 15 of smaller diameter than D is provided downstream of the first boss 13. Both bosses are centrally mounted in the tube 11 by way of spider mountings (not shown). A microphone 16 is mounted on the outside wall of the tube 11. As water is passed through the tube 11 the rotary component of velocity imparted to it by the blades 11 causes any fission product bubbles 17 in the water to move centripetally to lie about the axis of the tube 11. The bosses 13, 15 inhibit axial motion of the bubbles 17 which consequently accumulate in the region between the bosses 13, 15. The presence of bubble accumulation is detected by the microphone 16 whose leads can be linked to a suitable monitoring point situated outside the reactor. It has been found that interaction of bubbles in an accumulation thereof give rise to specific and detectable poise.

The apparatus renders unnecessary an independent sampling loop or loops within the reactor coolant circuitry. Fission product gasses from a fractured fuel element sheath can be accumulated as shown at any convenient point in the coolant circuit—conveniently just after each fuel element or channel so that the fractured element can be detected and its position identified as rapidly as possible.

Although a microphone is suggested for the detection of the bubbles other methods are possible such as detection of the attenuation of a beam of radiation by the existence of the bubbles.

I claim:
1. A method of testing for the occurrence of fuel sheathing failure in a liquid cooled nuclear reactor, said method comprising the steps of passing coolant over at least one fuel bearing member in the reactor and then through a tube defining a flow path for coolant, imparting to coolant flowing through the tube a rotary motion around the longitudinal axis of the tube such that bubbles in the coolant are urged centripetally to occupy a position about the longitudinal axis of the tube, restraining axial movement of the bubbles in said position by partial obstructions in the flow path, and testing for the presence of bubbles in said position.

2. Apparatus for testing for the occurrence of fuel sheathing failure in a liquid cooled nuclear reactor, comprising a tube defining a flow path for coolant from the reactor, at least one fuel bearing member in the reactor, two bosses disposed in series in, and partially obstructing, the flow path, the second boss being situated downstream of, and obstructing the tube to a lesser extent than, the first boss, means for imparting rotary motion to coolant in the flow path around the longitudinal axis of the flow path, at least between the two bosses, and means for detecting bubble accumulations between the two bosses.

3. Apparatus according to claim 2 for testing for the occurrence of fuel sheathing failure in a liquid cooled nuclear reactor, wherein the means for imparting rotary motion to coolant comprises flow diverters linked to the first boss.

4. Apparatus for testing for the occurrence of fuel sheathing failure in a liquid cooled nuclear reactor according to claim 2 wherein the means for detecting bubble accumulations is situated outside the tube.

5. Apparatus for testing for the occurrence of fuel sheathing failure in a liquid cooled nuclear reactor according to claim 2 wherein the means for detecting bubble accumulations is a microphone.

References Cited
UNITED STATES PATENTS
3,070,532  12/1962  Zebroski _____ 176—19
3,234,101  2/1966  Berthod _____ 176—19

REUBEN EPSTEIN, *Primary Examiner.*